(12) United States Patent
Choi et al.

(10) Patent No.: US 7,930,255 B2
(45) Date of Patent: Apr. 19, 2011

(54) SOCIAL PROFILE ASSESSMENT

(75) Inventors: Christopher Choi, Southport (AU); Christopher John Hockings, Burleigh Waters (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/166,567

(22) Filed: Jul. 2, 2008

(65) Prior Publication Data

US 2010/0004940 A1 Jan. 7, 2010

(51) Int. Cl.
*G06Q 99/00* (2006.01)
(52) U.S. Cl. .................................................. 705/319
(58) Field of Classification Search .............. 705/1.1, 705/319
See application file for complete search history.

(56) References Cited

U.S. PATENT DOCUMENTS

| | | | |
|---|---|---|---|
| 2006/0009994 A1* | 1/2006 | Hogg et al. | 705/1 |
| 2006/0042483 A1* | 3/2006 | Work et al. | 101/91 |
| 2006/0085419 A1 | 4/2006 | Rosen et al. | |
| 2006/0218153 A1 | 9/2006 | Voon et al. | |
| 2009/0063630 A1* | 3/2009 | Obasanjo et al. | 709/204 |

FOREIGN PATENT DOCUMENTS

WO WO 2007101278 A2 * 9/2007

* cited by examiner

*Primary Examiner* — Jamisue A Plucinski
*Assistant Examiner* — Maame Ofori-Awuah
(74) *Attorney, Agent, or Firm* — Yee & Associates, P.C.; John D. Flynn (57) ABSTRACT

An embodiment provides a computer implemented method for social profile assessment. The computer implemented method receives a request from a first user for an assessment, and sends questionnaires to a set of assessors for the first user. Upon receiving questionnaires from the set of assessors to form completed questionnaires, the computer implemented method generates an unadjusted social style assessment for the first user. Upon receiving a request from a second user for the social style assessment of the first user, the computer implemented method determines whether there are common assessors between the first user and the second user, and responsive to a determination that there are common assessors between the first user and the second user, generates an adjusted social style assessment for the first user, and returns the adjusted social style assessment for the first user to the second user.

20 Claims, 3 Drawing Sheets

SOCIAL PROFILE ASSESSMENT

BACKGROUND OF THE INVENTION

1. Field of the Invention

The present invention relates generally to an improved data processing system and, more specifically, to a computer implemented method, a data processing system, and a computer program product for social profile assessment.

2. Description of the Related Art

On-line social communities such as Facebook, a social utility operated by Facebook Incorporated, and MySpace, a social networking service operated by MySpace Incorporated, allows a person to interact with individuals who they may initially know very little about, and may never meet face-to-face. The communication with these people may be exclusively electronic in the form of email, online chat, and by reading each other's Web presence in the social networking application. Knowing how to communicate more effectively with people met in these circumstances is becoming an increasingly important skill. Similar examples exist in the business community, particularly in large, distributed organizations, such as International Business Machines Incorporated.

Most social networking applications provide a way for a user to create a self-proclaimed profile from which others can infer certain characteristics about them. For example, in Facebook, a user can specify their tastes in music, political views, religious views and sexual preference, among other things. A drawback of these self-asserted claims is that there is little assurance of accuracy. A user could make claims that are not consistent with how that user is perceived among people who know them; "friends" in the context of the social networking applications.

In order to encourage a broader level of interactions within social networking applications and to meet one of the goals of the communities hosted, there is a need for a mechanism to provide a more trusted assessment of social style. A person could then reliably determine if another person is of a compatible social style, or provide guidance on how a user may communicate more effectively with that person.

BRIEF SUMMARY OF THE INVENTION

According to one embodiment of the present invention, a computer implemented method for social profile assessment is shown. The computer implemented method receives a request from a first user for an assessment, and sends questionnaires to a set of assessors for the first user. Upon receiving questionnaires from the set of assessors to form completed questionnaires, the computer implemented method generates an unadjusted social style assessment for the first user. Upon receiving a request from a second user for the social style assessment of the first user, the computer implemented method determines whether there are common assessors between the first user and the second user, and responsive to a determination that there are common assessors between the first user and the second user, generates an adjusted social style assessment for the first user, and returns the adjusted social style assessment for the first user to the second user.

In another illustrative embodiment, a data processing system for social style assessment is provided. The data processing system comprises a bus, a memory connected to the bus, wherein the memory including computer executable instructions, a communication unit connected to the bus, a processor unit connected to the bus, wherein the processor unit executes the computer executable instructions to direct the data processing system to: receive a request from a first user for a social style assessment, send questionnaires to a set of assessors for the first user, receive questionnaires from the set of assessors to form completed questionnaires, generate an unadjusted social style assessment for the first user from the completed questionnaires, receive a request from a second user for the social style assessment of the first user, determine whether there are common assessors between the first user and the second user respond to a determination that common assessors are present between the first user and the second user, to generate an adjusted social style assessment for the first user, and return the adjusted social style assessment for the first user to the second user.

In yet another illustrative embodiment, a computer program product for social style assessment is provided. The computer implemented method comprises a computer readable recordable type medium having computer executable instructions tangibly embodied thereon. The computer executable instructions comprise computer executable instructions for receiving a request from a first user for a social style assessment, computer executable instructions for sending questionnaires to a set of assessors for the first user, computer executable instructions for receiving questionnaires from the set of assessors to form completed questionnaires, computer executable instructions for generating an unadjusted social style assessment for the first user from the completed questionnaires, computer executable instructions for receiving a request from a second user for the social style assessment of the first user, computer executable instructions for determining whether there are common assessors between the first user and the second user, computer executable instructions responsive to a determination that common assessors are present between the first user and the second user, for generating an adjusted social style assessment for the first user, and computer executable instructions for returning the adjusted social style assessment for the first user to the second user.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer implemented process such that the instructions which execute on the computer, or other programmable apparatus, provide processes for implementing the functions/acts specified in the flowchart and/or block diagram block or blocks.

Figure 1:
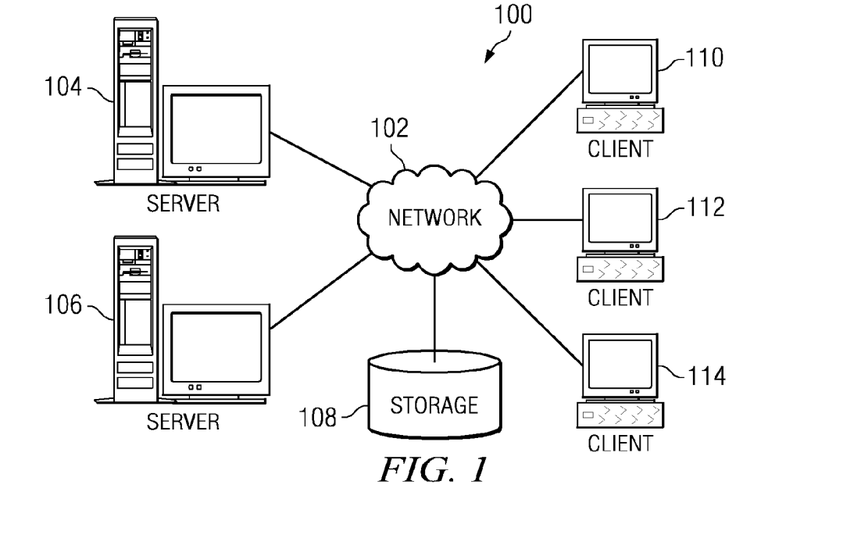
FIG. 1 depicts a pictorial representation of a network of data processing systems in which illustrative embodiments may be implemented.
Figure 2:
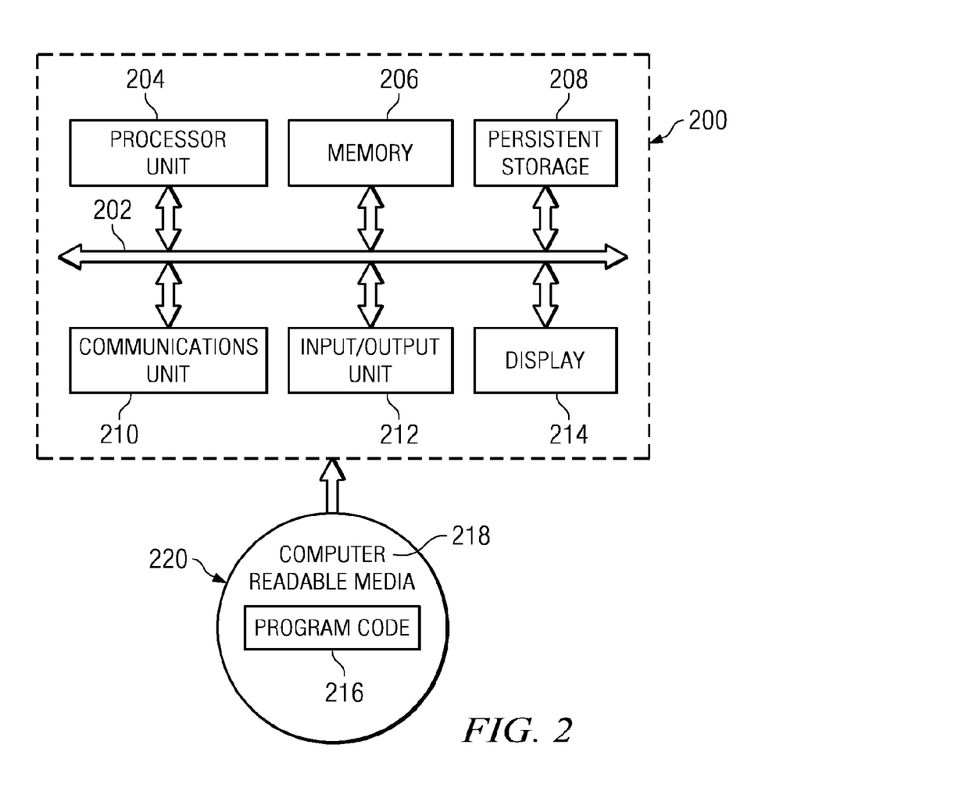
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

In accordance with an illustrative embodiment, using the example system 100 of FIG. 1, clients 110 and 112 request reviews from friends in a social networking application to assess the social style of each respective user. The assessments may be retrieved on server 104 or server 106 through network 102. Processing of the statistical average from these assessments is used to derive a consolidated view of the user's social style within well-known categories to create an assessment known as the unadjusted assessment. The processed assessment is maintained on server 104 or 106 as needed. An additional assessment known as the adjusted assessment then biases the results towards those assessments from mutual, and therefore more trusted, friends.

The derived assessments of social style can be used by one user to observe the social style of another user, and to communicate with that other user more effectively through techniques compatible with the identified social style. Existing applications may have similar concepts but the metrics used by the existing applications are not measures of an individual's social style, and the existing application intention is not related to the effectiveness of social interactions.

In an illustrative embodiment, the application now identifies the mutual friends of the requesters to improve the trust in the assessment being provided. The created profile of an individual is now based on peer assessments rather than a self-assessment as before.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system, including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202, and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
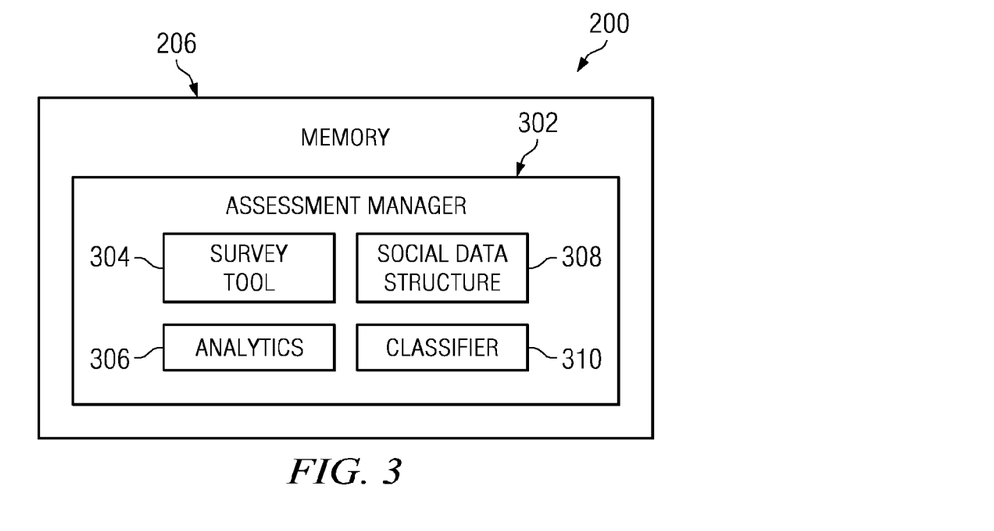
FIG. 3 is a block diagram of an assessment manager, in accordance with illustrative embodiments.

With reference to FIG. 3, a block diagram of an assessment manager, in accordance with illustrative embodiments, is shown. Assessment manager 302 is shown within memory 206 of system 200. Assessment manager 302 may also be located within other components of system 200, such as persistent storage 208, until such time as the manager is required to be used.

Assessment manager 302 contains a number of interrelated components comprising, survey tool 304, analytics 306, social data structure 308 and classifier 310. A user interface and messaging service are also presumed present, as well as other platform provided services of system 200, in support of assessment manager 302.

Survey tool 304 provides a capability to build, manage and conduct social network-based assessments within the sphere of network system 100 of FIG. 1. Survey tool 304 allows requesters to interact with the tool to take surveys and provide social assessment information. The information received from users undertaking a survey may be collected and stored for further processing by survey tool 304. Storage of survey results may occur in social data structure 308, or another persistent work data storage area, as required. Survey data may be collected to form sets of survey data. A set comprises one or more surveys. Each survey within a set originates with a user. The social style assessment may also be referred to as a social profile or a social assessment.

Analytics 306 provides a set of statistical capabilities to analyze the survey responses. Statistical capabilities include the ability to perform aggregation, averaging, weighted averages, and other calculations and adjustments, as necessary, to such response data. In this example, the set comprises one or more analytical tools used to perform statistical analysis.

Social data structure 308 is a data structure containing the results of the statistical analysis of the survey results. Social data structure 308 may also be used to contain the raw survey data, as well as processed survey data. The data structure provides a suitable repository for maintaining social profiles or social style assessments of individual users resulting from processing of the survey data. Each social profile is accessible by a user request. Access may be controlled to limit access to permitted users for the purpose of reading, updating and creating the profiles.

Classifier 310 provides a service of placing a profile owner into a group or classification, in accordance with attributes of the associated social profile. For example, a classification of "sports fan" could be applied to a profile owner assessed as a sports participant or enthusiast. Other classifications, groups, or roles may be created for the purpose of identifying gross attributes of a profile owner.

Figure 4:
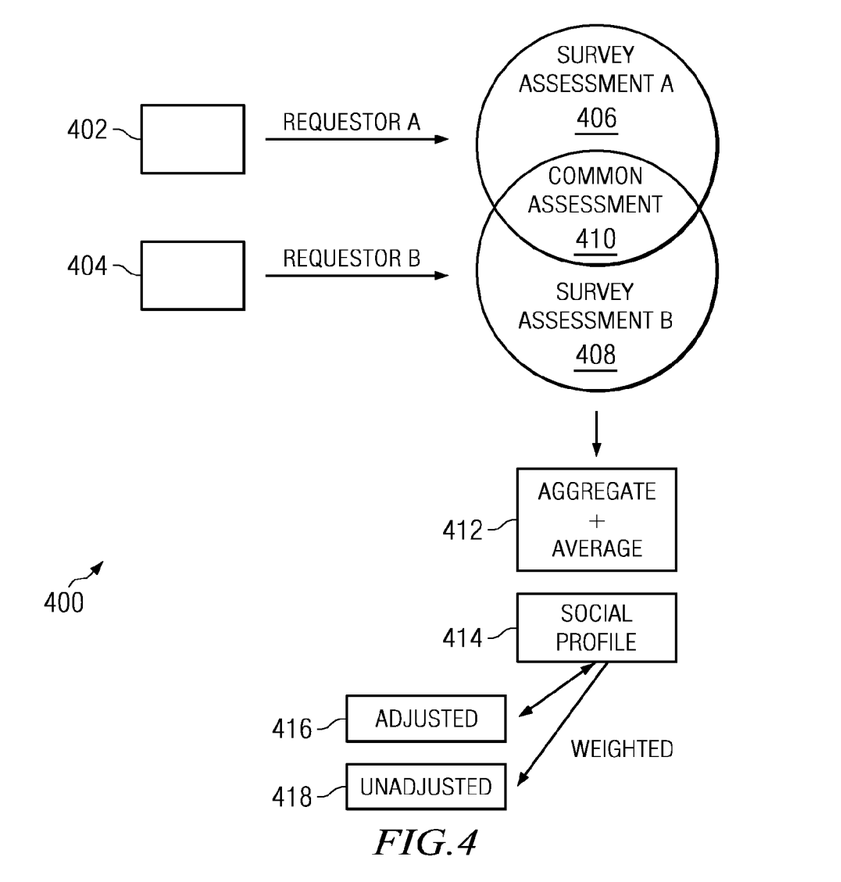
FIG. 4 is a block diagram of a social assessment system in accordance with illustrative embodiments.

With reference to FIG. 4, a block diagram of a social assessment system, in accordance with illustrative embodiments, is shown. Social assessment system 400 is shown as a high-level view of component interaction.

Two individuals, or groups of individuals, each have a set of friends in a social networking application. The social networking application contains an embodiment of assessment manager 302 of FIG. 3. Within these groups of friends, there is a set of people who are friends of both individuals. The overlap of friends within social networking applications is common amongst a group of people who use the same social networking application. An assumption is that a person is more likely to trust the opinions of their friends over a more random collection of people from the membership of a social networking application.

A user who wishes to have their social style assessed selects a list of assessors from amongst their friends. The social networking application sends a questionnaire to each reviewer with either a link via email or a notification local to the social networking application. Questions are designed in such way that it will help to determine the specified user's alignment with a certain social style category or classification. The questions typically used could be derived from well-known materials on social style.

The questionnaires are completed and returned by the assessors. The social networking application calculates a statistical average from the results, and classifies the individual into a certain social style. This becomes the "unadjusted" assessment of social style. The method to aggregate data from multiple assessors to derive an average assessment can be derived from known techniques. When another user requests the specified user's social style in the social networking application, the application determines the list of common friends between the user and the specified user. The application will then bias the specified user's social profile towards the reviews completed by the common friends. This generated biased assessment becomes the "adjusted" assessment of the specified user's social style. For example, the adjusted assessment might be derived exclusively from the common set of friends, or perhaps the assessment is weighted 75 percent, based on the assessment from common friends.

The social networking application returns the requested social style assessment for the specified user, which includes both the "unadjusted" and the "adjusted" social style assessments. The application will also return the number of reviewers and the number of common friends amongst the reviewers. If there are no common friends, then only the unadjusted social style assessment will be displayed. Both the "unadjusted" and the "adjusted" social style assessments provide information about the specified user's individual's characteristics with some degree of trust. The "unadjusted" social profile represents a wider opinion about the specified user than a self-assessment. The social profile typically becomes more trustworthy as the number of reviewers increases because the probability that an assessor knows the characteristics of the individual being assessed increases as well, therefore providing more accurate results.

The "adjusted" social profile represents a more trusted opinion about the individual because it represents the aggregation of opinion amongst people (friends) known to the specified user. Part of the trust comes from the ability to contact those friends known to the specified user to validate the assessment or discuss further.

Using the example of FIG. 4, a social assessment survey is performed by two groups of users—requester A 402 and requester B 404 for a specified user. A survey is performed by each of the groups of requesters, and shown as survey assessment A 406 and survey assessment B 408. Common assessment 410 is an indication that both groups have users that know, or are known, to the specified user.

The survey assessments are performed by users other than the user target of the survey. The survey assessments are designed to replace or augment a user self-assessment. Common assessment 410 has a higher probability of being accepted as an accurate portrayal of the specified user than survey assessment A 406 and survey assessment B 408 in general. Survey assessment A 406 and survey assessment B 408 in general have a higher probability of accuracy of assessment than a user self-assessment. The accuracy is an indication of trust with respect to how users would view the survey responses. A trust level is higher when people known to the user provide the assessment information.

The survey assessments are collected together and then analyzed statistically to produce aggregate and average 412, across the survey assessments. From aggregate and average 412 is generated social profile 414. Social profile 414 contains a set of attributes and values descriptive of the specified user that may be viewed by others users. Social profile 414 may be used to determine who to contact, and if contact is to be made in a certain form or style. Other choices may also be driven by viewing and interpreting the profile.

Social profile 414 may be weighted or adjusted assessment 416 or unadjusted assessment 418. Adjusted assessment 416 has been modified by a weighting factor attributed to the use of known assessors. For example, if all of the assessments were performed by assessors known to the specified user, the resulting profile may have a 100% trust factor applied. If a few of the assessors are known to the specified user, then the trust factor is reduced to less than 100%, and may be determined as a percentage of known assessors versus total assessors. When there are no assessors in common, that is no assessors are known to the specified user, then only the unadjusted assessment is used.

Figure 5:
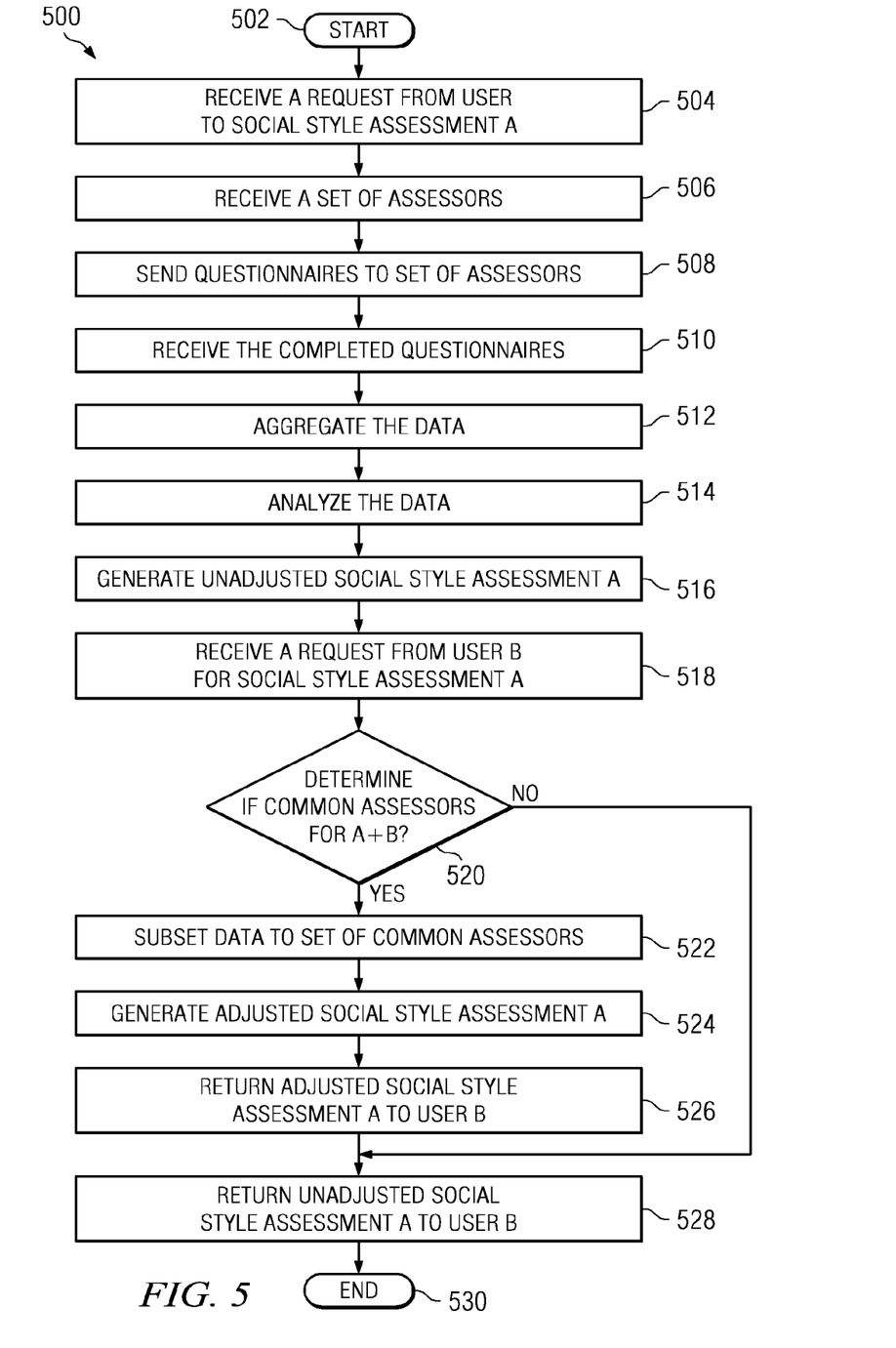
FIG. 5 is a flowchart of a process using an assessment manager in accordance with illustrative embodiments.

With reference to FIG. 5, a flowchart of a process using an assessment manager, in accordance with illustrative embodiments, is shown. Process 500 is an example of a process using assessment manager 302 of FIG. 3.

Process 500 starts (step 502) and receives a request from user A for a social style assessment A (step 504). A social style assessment may also be referred to as a social style profile, a social profile, or just profile. In addition, a set of assessors is received (step 506). A set of assessors contains more than one assessor. A questionnaire is sent to each of the set of assessors (step 508). The assessors complete the questionnaires and return the questionnaires. Receive the completed questionnaires is performed (step 510) to accept the completed input from the selected assessors.

Data from the received questionnaires is processed to aggregate the data (step 512). Statistical methods are performed to analyze the data (step 514). The analyzed data is used to generate unadjusted social style assessment A (step 516).

From user B is received a request for social style assessment A (step 518). A determination is made as to whether common assessors exist for user A and user B (step 520). If common assessors exist, a "yes" is returned. If there are no common assessors, then a "no" results. When a "no" is returned in step 520, process 500 skips ahead to return unadjusted social style assessment A to user B (step 528), and terminates thereafter (step 530).

When a "yes" is returned in step 520, a subset of data to a common set of assessors is created (step 522). An adjusted social style assessment A is generated from the subset (step 524). The adjusted social style assessment A is returned to user B (step 526). Process 500 then performs step 528 and 530 as previously described.

In an illustrative embodiment, a set of assessors provides input in the form of collected social assessment survey results for a specified user. When the set of assessors contains a number of assessors in common with the specified user, the survey results provided may be adjusted. The adjustment reflects a higher level of trust in the accuracy of the results because the assessors have knowledge of the specified user.

When there are no common assessors, the results provided are unadjusted. In the case of common assessors, both adjusted and unadjusted results are provided, as well as the number of common assessors and total assessors. Adjustment may reflect the proportion of the number of common assessors to the total number of assessors.

The flowchart and block diagrams in the Figures illustrate the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments, with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer implemented method for social style assessment, a computer performing method steps comprising:
   receiving a request from a first user for a social style assessment;
   sending questionnaires to a set of assessors for the first user;
   receiving questionnaires from the set of assessors to form completed questionnaires;
   generating an unadjusted social style assessment for the first user from the completed questionnaires;
   receiving a request from a second user for the social style assessment of the first user;
   determining whether there are common assessors between the first user and the second user;
   responsive to a determination that common assessors are present between the first user and the second user, generating an adjusted social style assessment for the first user; and
   returning the adjusted social style assessment for the first user to the second user.

2. The computer implemented method of claim 1, wherein generating an unadjusted social style assessment for the first user further comprises:
   aggregating data within the completed questionnaires to form aggregate data; and
   analyzing the aggregate data from the set of assessors to form an average of the aggregate data.

3. The computer implemented method of claim 2, wherein generating an adjusted social style assessment for the first user further comprises:
   identifying a set of assessors common between the first user and the second user to form a common set of assessors;
   subsetting the aggregate data, to the common set of assessors, to form common data;
   analyzing the common data to form averaged data; and
   applying a weight to the averaged data.

4. The computer implemented method of claim 1 further comprises:
   returning one or more of the unadjusted social style assessment for the first user, a number of users in the set of assessors and the number of users in the common set of assessors to the second user.

5. The computer implemented method of claim 1, wherein generating an adjusted social style assessment for the first user further comprises:
   calculating a proportion of the common set of assessors to the set of assessors to form a percentage value; and
   setting the percentage value as the weight.

6. The computer implemented method of claim 3, wherein the weight is selected by one of the first user and the second user.

7. A data processing system for social style assessment, the data processing system comprising:
   a bus;
   a memory connected to the bus, wherein the memory including computer executable instructions;
   a communication unit connected to the bus;
   a processor unit connected to the bus, wherein the processor unit executes the computer executable instructions to direct the data processing system to:
   receive a request from a first user for a social style assessment;
   send questionnaires to a set of assessors for the first user;
   receive questionnaires from the set of assessors to form completed questionnaires;
   generate an unadjusted social style assessment for the first user from the completed questionnaires;
   receive a request from a second user for the social style assessment of the first user;
   determine whether there are common assessors between the first user and the second user;
   respond to a determination that common assessors are present between the first user and the second user, to generate an adjusted social style assessment for the first user; and
   return the adjusted social style assessment for the first user to the second user.

8. The data processing system of claim 7, wherein the processor unit executes the computer executable instructions to direct the data processing system to generate an unadjusted social style assessment for the first user further comprises:
   aggregate data within the completed questionnaires to form aggregate data; and
   analyze the aggregate data from the set of assessors to form an average of the aggregate data.

9. The data processing system of claim 8, wherein the processor unit executes the computer executable instructions to direct the data processing system to generate an adjusted social style assessment for the first user further comprises:
   identify a set of assessors common between the first user and the second user to form a common set of assessors;
   subset the aggregate data, to the common set of assessors, to form common data;
   analyze the common data to form averaged data; and
   apply a weight to the averaged data.

10. The data processing system of claim 7, wherein the processor unit executes the computer executable instructions to further direct the data processing system to:
    return one or more of the unadjusted social style assessment for the first user, a number of users in the set of assessors and the number of users in the common set of assessors to the second user.

11. The data processing system of claim 7, wherein the processor unit executes the computer executable instructions to direct the data processing system to generate an adjusted social style assessment for the first user further comprises:

calculate a proportion of the common set of assessors to the set of assessors to form a percentage value; and set the percentage value as the weight.

12. The data processing system of claim 9, wherein the weight is selected by one of the first user and the second user.

13. A computer program product for social style assessment, the computer program product comprising a non-transitory computer readable recordable type medium having computer executable instructions tangibly embodied thereon, the computer executable instructions comprising:

computer executable instructions configured to receive a request from a first user for a social style assessment;

computer executable instructions configured to send questionnaires to a set of assessors for the first user;

computer executable instructions configured to receive questionnaires from the set of assessors to form completed questionnaires;

computer executable instructions configured to generate an unadjusted social style assessment for the first user from the completed questionnaires;

computer executable instructions configured to receive a request from a second user for the social style assessment of the first user;

computer executable instructions configured to determine whether there are common assessors between the first user and the second user;

computer executable instructions configured to, responsive to a determination that common assessors are present between the first user and the second user, generate an adjusted social style assessment for the first user; and computer executable instructions configured to return the adjusted social style assessment for the first user to the second user.

14. The computer program product of claim 13, wherein computer executable instructions configured to generate an unadjusted social style assessment for the first user further comprise:

computer executable instructions configured to aggregate data within the completed questionnaires to form aggregate data; and computer executable instructions configured to analyze the aggregate data from the set of assessors to form an average of the aggregate data.

15. The computer program product of claim 14, wherein computer executable instructions configured to generate an adjusted social style assessment for the first user further comprise:

computer executable instructions configured to identify a set of assessors common between the first user and the second user to form a common set of assessors;

computer executable instructions configured to subset the aggregate data, to the common set of assessors, to form common data;

computer executable instructions configured to analyze the common data to form averaged data; and computer executable instructions configured to apply a weight to the averaged data.

16. The computer program product of claim 13 further comprises:

computer executable instructions configured to return one or more of the unadjusted social style assessment for the first user, a number of users in the set of assessors and the number of users in the common set of assessors to the second user.

17. The computer program product of claim 13, wherein computer executable instructions for generating an adjusted social style assessment for the first user further comprise:

computer executable instructions configured to calculate a proportion of the common set of assessors to the set of assessors to form a percentage value; and computer executable instructions configured to set the percentage value as the weight.

18. The computer program product of claim 15, wherein the weight is selected by one of the first user and the second user.

19. An apparatus for a social style assessment, the apparatus comprising:

an assessment manager executed by a processing unit, wherein the assessment manager further comprises;

a survey tool configured to collect a set of social style assessment data from a set of assessors for a first user;

analytics configured to analyze the set of social style assessment data to form a social style assessment for the first user;

a social data structure configured to store the social style assessment;

a classifier configured to classify the social style assessment in accordance with attributes of the social style assessment; and wherein the assessment manager is further configured to receive a request for the social style assessment of the first user from a second user, determine whether there are common assessors between the first user and the second user, generate an adjusted social style assessment for the first user responsive to a determination that there are the common assessors between the first user and the second user, and return the adjusted social style assessment for the first user to the second user.

20. The apparatus of claim 19, wherein the analytics further comprise a weight assignment configured to perform weighted average computations.

* * * * *